United States Patent [19]

Kurokawa et al.

[11] Patent Number: 4,717,622
[45] Date of Patent: Jan. 5, 1988

[54] MAGNETIC RECORDING MEDIA

[75] Inventors: Hideo Kurokawa, Katano; Tsutomu Mitani, Neyagawa; Taketoshi Yonezawa, Ibaraki, all of Japan

[73] Assignee: Matsushita Electric Industrial Co., Ltd., Kadoma, Japan

[21] Appl. No.: 838,814

[22] Filed: Mar. 11, 1986

[30] Foreign Application Priority Data

Mar. 13, 1985 [JP] Japan .................................. 60-50031

[51] Int. Cl.$^4$ .............................................. G11B 5/64
[52] U.S. Cl. ...................... 428/408; 427/34; 427/250; 427/402; 427/407.1; 428/420; 428/694; 428/900; 204/192.1; 204/192.11
[58] Field of Search .................... 428/694, 900, 408; 427/131, 402, 407.1, 34, 250; 204/192.11, 192.1

[56] References Cited

U.S. PATENT DOCUMENTS 4,411,963 10/1983 Aine ..................................... 427/132
4,503,125 3/1985 Nelson et al. ........................ 427/131

FOREIGN PATENT DOCUMENTS 54-33521 10/1979 Japan .
60-145524 8/1985 Japan .................................. 428/695

OTHER PUBLICATIONS

Applied Mechanical Engineering, Jul./1984, "Investigation of Low Pressure Synthesis of Diamond Thin Layer", 4 pp., (translation-6 pp.).
Modern Chemistry, Sep./1984, "Low Pressure Synthesis of Diamond", 8 pp. (tanslation-4 pp.).
Japan Industrial Technology Promotion Assoc., Technical Data, No. 138, Jun./1984, "Low Pressure Synthesis of Diamond", 8 pp. (translation-4 pp.).

Primary Examiner—Paul J. Thibodeau
Attorney, Agent, or Firm—Cushman, Darby & Cushman

[57] ABSTRACT

A magnetic recording medium has a protective layer made of high hardness carbon synthesized under a low-temperature and a low-pressure by blowing hydrocarbon gas plasma onto a magnetic recording layer. The resistance thereof is large, and therefore, high density magnetic recording can be realized in a magnetic recording system wherein the magnetic head contacts the magnetic recording medium. Durability of the magnetic recording medium is substantially improved.

8 Claims, 8 Drawing Figures

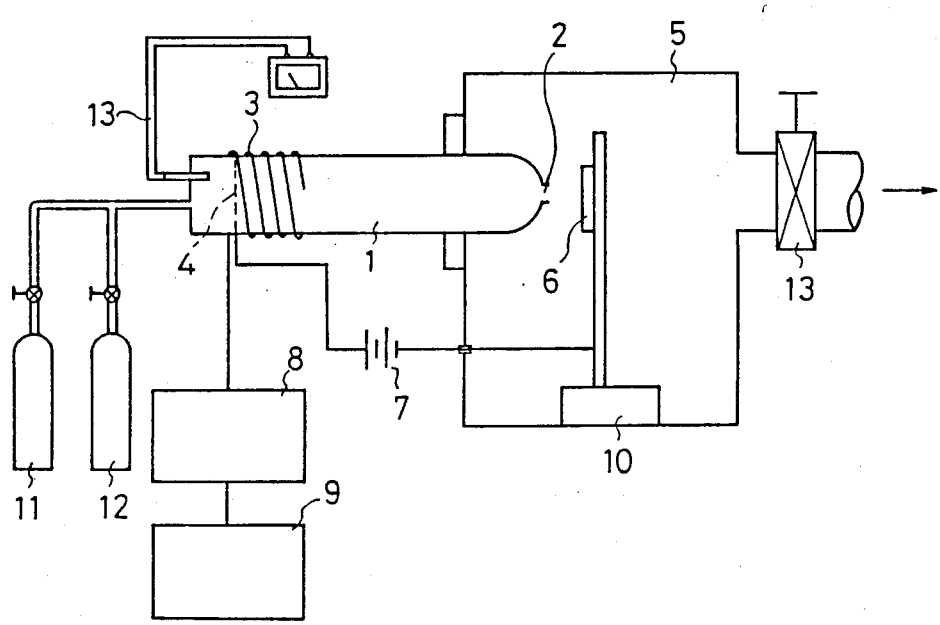
F I G. 2

MAGNETIC RECORDING MEDIA

BACKGROUND OF THE INVENTION

1. Field of the Invention

The present invention relates generally to recording media, and particularly pertains magnetic recording media which have a thin layer of ferromagnetic metal as a recording layer by which signals such as of video, audio and data are recorded in high density.

2. Description of the Related Art

Recently, a recording medium using ferromagnetic metal such as Co, Ni, Cr and Fe is drawing attention as a recording medium to realize high density magnetic recording, and various investigations have been made to put it to practical use.

In the magnetic recording, when spacing is brought about between a recording layer and a magnetic head as an electromagnetic convertor, spacing loss is caused thereby. Particularly, when the recording frequency is high, such as in a high density recording, the above-mentioned clearance should be made as small as possible, since the spacing loss becomes remarkable when the spacing exists. In recording or playback an audio-video signal, the magnetic head is usually made to contact the recording media. And further, even in recording of a data signal, when the demand for reliability of recording is not so severe, for instance, in case of a floppy disk, the recording media can be made to contact the magnetic head. When the demand for reliability of recording is high, the magnetic head is made to float apart from the surface of the recording media to keep non-contact in order to avoid undesirable friction between the magnetic head and the recording media. However, even in such high reliability multiple magnetic recording systems, they are constructed in a manner that the magnetic head contacts with the recording media at the time of starting or stopping of recording or playback. And further, since the flotation of the magnetic head above the recording medium face causes a spacing loss, they are unsuitable for high density recording. From the above viewpoint, considering the adaptation for high density recording in future, it is more desirable that the recording medium contacts with the magnetic head, thereby to realize and retain the reliability of recording.

That is, a magnetic recording system has a problem that is fundamentally different from that of a optical recording system, because in the magnetic recording system the magnetic head generally contacts the recording medium.

The aforementioned magnetic recording medium, which has thin layer made of ferromagnetic metal such as Co, Cr, Ni and Fe as recording layer, has a large coercive force. Therefore, it is suitable for high density recording, for instance, vertical recording, and so on. However, when a protective layer is not formed on a surface of the ferromagnetic metal thin layer, the formation of an effective protective layer on the recording layer is advantageous to protect the recording layer from damage from contacting with the magnetic head.

In conventional magnetic recording media, wherein magnetic powder mixed with binder is applied to the base film as substrate, so as to avoid problem caused by contact of the magnetic head and the magnetic recording media, a sustance has been added to the binder to give resistance against wear and to impart smoothness to the contact surface of the magnetic recording media.

However, in magnetic recording media having a ferromagnetic metal thin layer as a recording layer, such improvements are intended in wear resistance, smoothness and running durability of the magnetic recording media per se as oxidizing surface of the recording layer or the like. In such case, deterioration of the magnetic property of the recording layer can not be avoided. Therefore, it is necessary to keep the characteristics of the recording layer, such as wear resistance, by forming a protective layer on the surface of the recording layer. And further, since such a protective layer brings about distance between the magnetic head and the recording layer, the thickness of the protective layer should be as small as possible.

Hitherto, a protective layer containing an organic substance as a lubricating material and made by vacuum vapor deposition on the surface of the ferromagnetic metal has been developed. But since it has poor wear resistance, it could not bear long time of use. And further, although trials have been made in forming the layer of amorphous carbon or graphite on the surface of the ferromagnetic metal layer by vacuum vapor deposition, spattering or the like, improvement of the smoothness has been obtained only to a certain extent, while sufficient wear resistance could not be obtained.

In case that the above-mentioned material is used as the protective layer of a magnetic recording medium havng a recording layer of a thin layer of ferromagnetic metal, the thickness of the protective layer could not be decreased without losing wear resistance. As a result, the distance from the magnetic head to the magnetic recording medium becomes large, thereby generating a large spacing loss. And further, since the above-mentioned protective layer is worn by contacting with the magnetic head, fine powder of the protective layer material is produced and the powder sticks to the magnetic head, hence remarkablly lowering quality and level of output due to clogging up and dropout.

Owing to the above-mentioned problems, practical use of the high density magnetic recording media having a ferromagnetic metal thin layer as a recording layer has been hitherto much restricted. Therefore, satisfactory high density recording can not be attained so long as the above-mentioned problems are not settled.

To solve the above-mentioned problems, a protective layer which is splendid in smoothness, wear resistance and adhesive ability is indispensable. Furthermore, it is required that: substrate or base material (hereinafter referred to as base material) such as polyethylene based film (in case of tape-shaped magnetic recording media) is not damaged by rising temperature, while the protective layer is formed; a homogenous layer can be formed, even if the thickness of the protect layer is small; and the deposition rate of the protective layer is large, and is suitable for mass production.

It is thought that diamond is suitable for material of the protective layer satisfying the abovementioned requirement. Diamond is a crystalline material having the highest hardness among all substances, it is extremely chemically stable and it is considered to be splendid in the wear resistance and durability in various surroundings of usage. Concerning methods for forming a thin layer of diamond, many reports have been made, and they are disclosed in reference literature as follows:

(1) OYOKIKAIKOGAKU (Applied Mechanical Engineering),

July/1984, "DAIAMONDO HAKUMAKU NO TEIATSUGOSEI NO KENKYU" (Investigation of low pressure synthesis of diamond thin layer)

(2) GENDAIKAGAKU (Modern Chemistry), September/1984, "DAIAMONDO NO TEIATSUGOSEI" (Low pressure synthesis of diamond)

(3) NIHON SANGYOGIJUTSU SHINKOKYOKAI (Japan Industrial Technology Promotion Association) GIJUTSU SHIRYO (Technical data) No. 138, June/1984, "DAIAMONDO NO TEIATSUGOSEI" (Low pressure synthesis of diamond)

However, all of the reports made in them are in an academic researching stage, and have not been put into practice. Further, it is very difficult to use any of these reported methods as a forming means for a diamond protective layer for magnetic recording media, because the above-mentioned methods require heating of the base material to a high temperature (above 400° C.), and the rate of deposition of the diamond layer is slow (a maximum of 200–300 Å/minute).

SUMMARY OF THE INVENTION

The present invention is intended to solve the above-mentioned problems, and the purpose of the present invention is to obtain a magnetic recording medium having a protective layer which is splendid in wear resistance on a recording layer made of ferromagnetic metal.

The magnetic recording medium of the present invention comprises:

a base material made of non-magnetic material, a recording layer made of ferromagnetic material and disposed on the base material, and a protective layer disposed on the recording layer, the protective layer being made of high hardness carbon which is capable of being formed by low-temperature, low-pressure synthesis.

The above-mentioned low-temperature, low-pressure synthesis is carried out by blowing hydrocarbon gas plasma which contains at least accelerated ions, to the recording layer.

BRIEF DESCRIPTION OF THE DRAWINGS

FIG. 2 is a schematic diagram of apparatus by which the present invention is put into practice.

DESCRIPTION OF THE PREFERRED EMBODIMENT

Figure 1:
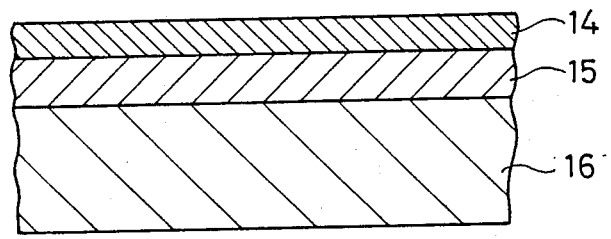
FIG. 1 is a sectional view showing a magnetic recording medium of an embodiment of the present invention.

In advance of explaining an embodiment of the present invention, a method for forming a high hardness carbon layer used as a protective layer for the article of the present invention is described.

Methane gas as the raw material for the carbon layer is made into a plasma at a pressure of 10–100 Pa, and at least ions in the plasma are blown onto a base material by potential difference. Thereby, it becomes possible to form the high hardness carbon layer at a high deposition rate of about 5000 Å/minute at normal temperature, i.e., without heating of the base material. The above-mentioned method is called the plasma-injection chemical vapor deposition method (hereinafter referred to as the PI-CVD method).

An apparatus for carrying out the PI-CVD method comprises a first vacuum chamber having plasma generating means of a non-electrode induction coupling type, an accelerating means to accelerate at least ions in the plasma toward the base material, and a second vacuum chamber into which the base material is put and which is connected with the first vacuum chamber in a manner to cause gas circulation to occur between the first and second vacuum chambers.

Hydrocarbon gas and an inactive gas, such as argon gas, are introduced into the first vacuum chamber, which is evacuated in advance, and thereby the pressure of the first vacuum chamber is adjusted to a predetermined pressure.

The first vacuum chamber has at least one of the introducing ports through which gas is introduced, and further it has at least one plasma jetting nozzle to blow the plasma onto the base material. The hydrocarbon gas and the inactive gas may be mixed either before or after the introduction thereof into the first vacuum chamber.

The first vacuum chamber is connected with the second vacuum chamber in a manner to allow the gas to flow, the pressure in the second vacuum chamber is lower than that of the first vacuum chamber. Therefore, the mixed gas is caused to flow only by the pressure difference between the two vacuum chambers. The mixed gas is made into plasma by the plasma generation means, after the pressure of the first vacuum chamber is adjusted to a predetermined pressure.

Radio heating, microwave heating, heat decomposition and ion beam heating or the like may be thought of for use as plasma generation means, but among them, radio heating is most desirable because it hardly raises the temperature of the base material.

The plasma which is thereby generated is of low pressure of 10–100 Pa and has a viscous flow characteristic, and therefore by pressure difference between the first vacuum chamber and the second vacuum chamber only the plasma is made to blow onto the base material. Further, when an accelerating means based on a direct current electric field, such that the base material side is of negative electric potential, is used, the ions in the plasma are accelerated and blown onto the base material. By accelerating the ions, the flow of the plasma is directed toward the base material, and further, radical species and neutral seeds or the like as well as the ions efficiently reach the base material, thus forming a layer of carbon.

In the radical species, carbon radicals and hydrocarbon radicals have a substantial effect upon the formation of the layer. Since the carbon radicals form the layer by mutual reaction of the carbon radicals, a high bonding strength layer is formed. The hydrocarbon radicals are decomposed into carbon atoms, hydrogen atoms and hydrogen radicals on surface of the base material by collision of ions or catalytic action of the hydrogen, whereby the layer is formed.

In a plasma wherein such as one created when a mixture of hydrocarbon and argon gas is excited, there exist ions and radicals of carbon, hydrocarbon, hydrogen and argon, and further electrons. The ions and radicals function as a catalyst for dehydrogenation of the hydrocarbon, and further, they suppress deposition of graphitic carbon, thereby effecting deposition of only diamond-structure carbon.

Argon ions in the plasma are accelerated by an accelerating means and they bombard the surface of the base material. Due to the bombardment energy, carbon-hydrogen bonds on the surface of the layer are cut, and the carbon content of the layer increases. Furthermore, some of the bonds between carbons in the layer are changed into diamond structure bonds. Moreover, since electrolytic dissociation voltage of a hydrocarbon gas such as methane gas is 8–10 eV while a metastable voltage of argon gas is 11.53 eV, generation of the plasma is promoted and stabilized by the known Penning effect.

Next, apparatus for performing the PI-CVD method is explained concretely in detail with reference to FIG. 2.

FIG. 2 is a schematic diagram showing an example of the PI-CVD method-performing apparatus. A plasma tube 1 is connected with vacuum chamber 5 in a manner such that output part 2 disposed on the tip of the plasma tube opposite to the base material 6 which is held on a base material support stand 10. A coil 3 is wound around the circumference of the plasma tube. An accelerating electrode 4, which is set at a right angle to the flow direction of the plasma, is installed in the plasma tube 1. A direct current electric field is applied between the accelerating electrode 4 and the base material 6 from a direct current power supply 7. The plasma tube 1 and the vacuum chamber 5 are evacuated by a vacuum pump through a main valve 14. Therefore, by monitoring the pressure using Pirani guage 13, methane gas 11 and argon gas 12 are introduced, and a high frequency voltage is applied to an exciting coil 3 from high frequency power supply 9 through a matching box 8. By such means the gas in the chamber is excited into the plasma state. The plasma blows onto the base material 6 due to the pressure difference between the plasma tube 1 and the vacuum chamber 5 and by acceleration of the ions therein by application of the direct current electric field to the plasma. Thus, a high hardness carbon layer is formed on the surface of the base material 6.

As mentioned above, by the PI-CVD method, it is possible to form high hardness carbon having a Vicker's hardness of above 2000 Kg/mm² at normal temperature, without heating, and a high growth rate having a maximum of 5000 Å/minute is obtainable. Therefore the PI-CVD method is suitable for mass production.

Next, the components and crystal structure of the layer formed by the PI-CVD method are described.

Figure 3:
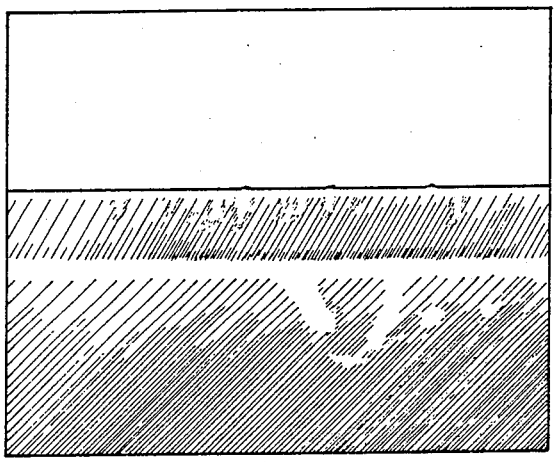
FIG. 3 is a schematic illustration showing an image from an electron microscope of a cross-section of the high hardness carbon layer formed by the PI-CVD method.
Figure 4:
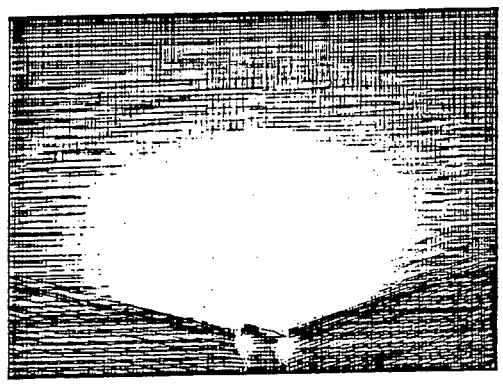
FIG. 4 is a schematic illustration showing an image of electron ray diffraction.

The layer formed by the PI-CVD method is very homogenous in every direction as shown in FIG. 3, which is a sketch based upon an electromicroscopic photograph. Through an electron ray diffraction analysis, it is found that a ring or spot to show existence of crystal in an electron ray diffraction image cannot be observed at all. As shown in FIG. 4, which is a sketch based upon an electromicroscopic photograph, the high hardnenss carbon layer formed by the PI-CVD method is of non-crystalline (amorphous state) structure.

Figure 5:
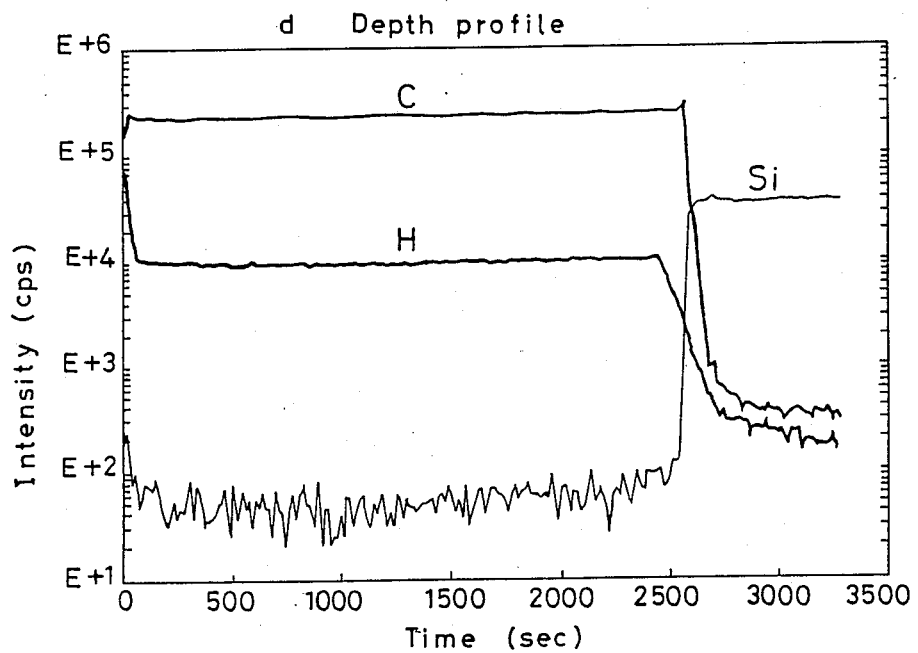
FIG. 5 is a characteristic diagram showing a result of secondary ion mass spectroscopic analysis.
Figure 6:
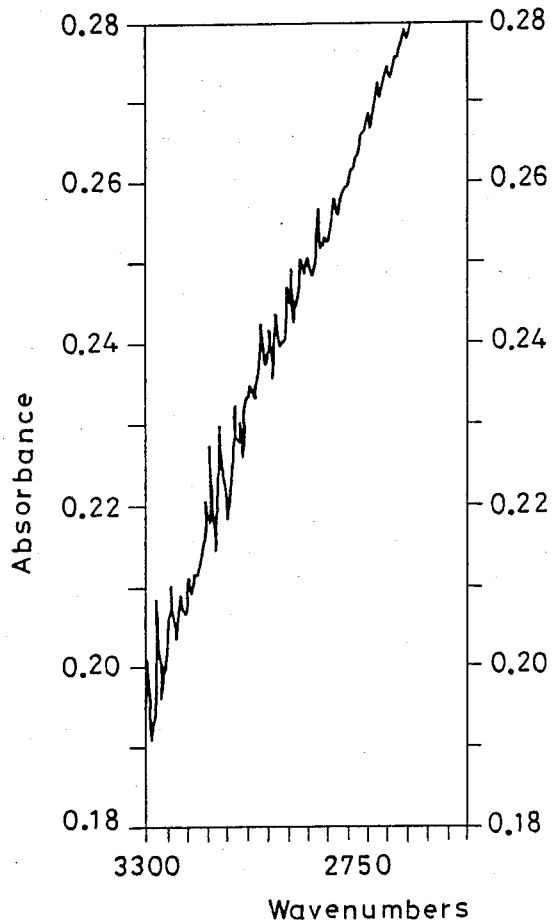
FIG. 6 is a characteristic diagram showing a result of infrared spectroscopic analysis.

FIG. 5 is a graph which shows the result of secondary ion mass analysis for components in the direction of thickness of the high hardness carbon layer formed on the silicon base film. As shown in FIG. 5, the high hardness carbon layer formed by using the PI-CVD method comprising carbon and hydrogen, and is homogenous in the direction of thickness. A SIMS analysis superficially shows that content of hydrogen is rather high, but this is because the sensitivity of hydrogen is higher than that of carbon in a SIMS analysis. However, as a result of infrared spectroscopic analysis, it is considered that the content of hydrogen in the layer is small (under 5%), and almost all of the layer consists of carbon atoms. This is confirmed by the fact that a peak showing the existence of carbon-hydrogen bonds can not be observed at all. Further, residual gas, such as oxygen, and inactive gas besides hydrogen gas, such as argon are contained in the high hardness carbon layer, but they do not influence any characteristics of the layer which are important in use.

Figure 7:
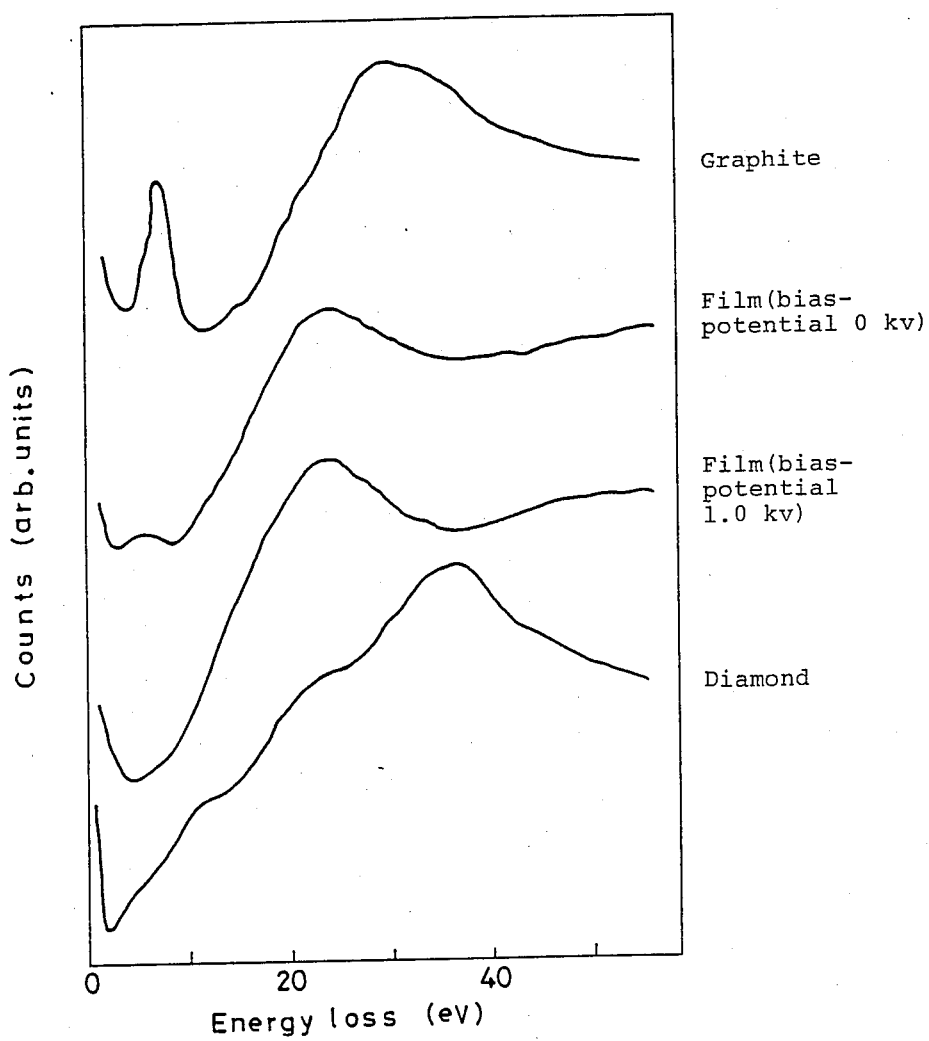
FIG. 7 is a characteristic diagram showing a result of energy loss spectroscopic analysis.

The result of energy loss spectroscopic analysis for the bonding structure of carbon atoms in the layer is shown in FIG. 7. As substances constructed of carbon atoms, there are three kinds of substances, namely, amorphous carbon (such as soot), graphite and diamond. And, as shown in FIG. 7, for graphite, the plasmon peak based on $\pi$ electron is observed clearly at 6–7 eV of energy loss, and further, even for amorphous carbon, the plasmon peak is observed to a certain extent. On the other hand, for diamond, the plasmon peak is not observed at all. Therefore, a significant criterion for distinguishing a diamond structure from other structures is whether the plasmon peak is observed. The plasmon peak observed at above 20 eV of energy loss (graphite: 26.5 eV, diamond: 23 eV–35 eV) is based on whole valence electrons, and it depends on the density thereof.

As mentioned above, in the PI-CVD method, at least ion in the plasma is accelerated, and a hard layer is formed. However, when the ion is not accelerated, the resultant layer is relatively soft (Vicker's hardness: below 1500 Kg/mm²). Observing the energy loss spectrum, though slight, a plasmon peak is observed at 6–7 eV of the energy loss. On the other hand, for a hard layer wherein the ion is accelerated while carrying out the deposition process thereof, a plasmon peak is not observed at 6–7 eV of energy loss.

From the above discussion, it is considered that the crystal structure of the high hardness carbon layer formed by the PI-CVD method is of diamond structure carbon, although graphite structure carbon and amorphous carbon partly constitute it. The plasmon peak based on valence electrons is observed at 24–25 eV of energy loss, and it does not agree with the plasmon peaks of graphite and diamond. It is considered that a small amount of the graphite structure or amorphous carbon is contained in the diamond structure.

As a result of the above-mentioned analyses, it is considered that the high hardness carbon layer formed by the PI-CVD method is a non-crystalline carbon layer wherein graphitic carbon, amorphous carbon and hydrogen partly constitute the diamond structure carbon layer. Hereinafter, the high hardness carbon layer formed by the PI-CVD method is referred to as an amorphous diamond layer.

In high hardness carbon layer formed by conventional methods, since a diamond crystal is dotted in the single crystal of the diamond or the amorphous carbon, the layer is not of completely non-crystalline and is fundamentally different from the amorphous diamond layer produced by the PI-CVD process.

The amorphous diamond layer shows a Vicker's hardness of above 2000 Kg/mm$^2$ and is splendid in wear resistance, and its coefficient of friction measured by using a steel ball is less than 0.1, and is no more than that of magnetic tape which contains lubricant. Moreover, the amorphous diamond layer is splendid in radiation of frictional heat, because it has a thermal conductivity of about 0.6 Cal/cm·sec·C°, which is equal to that of metal.

However, it is necessary for the base material to satisfy following two conditions:

First, the specific resistance of the base material must be less than about $10^{13}$ Ω·cm. The reason for this is that materials having a specific resistance of more than $10^{13}$ Ω·cm exhibit characteristic of an insulation material, which, when bombarded by plasma containing accelerated ions becomes charged with electricity and repells the ions, and because of this, it becomes impossible to form a firm layer. Further, when a neutralization step such as irradiation of electron beam is practiced, it is possible to form a firm layer, but materials having a specific resistance of more than $10^{13}$ Ω·cm are not preferable, since construction of the apparatus becomes complicated.

Second, the base material must have a strong chemical affinity for carbon and strong bonding strength among atoms in the carbide which is formed by the PI-CVD method.

Materials of the base which satisfy the above-mentioned two conditions are metals such as Al, Be, Co, Cr, Fe, Mu, Ni, Zn, Hf, V, Nb, Ta, Mo and W, alloys containing the above-identified metals as the main component and semiconductors made of Si, Ge, B and SiC and the like. Particularly, for Si, B and Cr, it is desirable that these strongly combine with carbon in a covalent bond or the like.

The specific resistance of the amorphous diamond layer is about $10^7$–$10^{13}$ Ω·cm, and satisfies the above-mentioned first condition.

Ferromagnetic materials such as Co, Cr, Fe and Ni satisfy both of the above-mentioned conditions, and therefore, it is possible to form a strong amorphous diamond layer on the surface thereof.

In case of tape-shaped magnetic recording media, mass production-ability is required, and the temperature rise during formation of the protective layer must be limited, when using polyethylene or the like as the base film. The formation of the amorphous diamond layer on the surface of such a recording medium is realized by the PI-CVD method for the first time when using the principles of the present invention.

As mentioned above, it is possible to form the amorphous diamond layer on the surface of a recording layer made of ferromagnetic metal, such as Co, Cr, Ni and Fe by using the PI-CVD method. Particularly in case of a ferromagnetic metal layer containing Co and Cr, a strong layer is formed because a rather large amount of Cr is maldistributed in the surface part of the layer.

The amorphous diamond layer is in an amorphous state, and its characteristics resemble those of diamond, and therefore, it is possible to protect the recording layer very efficiently. Since the amorphous diamond layer is in an amorphous state, it is soft to a certain extent. Therefore, it is effective for providing a protective layer for the recording layer on a flexible base film such as polyethylene.

As the protective layer, a thickness of the amorphous diamond layer of even under 1000 Å is sufficient, because the amorphous diamond layer is splendid in strength and wear resistance. Since the distance from the recording layer to the magnetic head can be made small, the amorphous diamond layer is suitable for high density recording. As far as an appropriate attention is given to state of contact with the magnetic head, a high recording reliability is realized even when the layer has a thickness of below 500 Å.

As mentioned above, the specific resistance of the amorphous diamond layer is $10^7$–$10^{13}$ Ω·cm, and therefore, undesirable static charging of the amorphous diamond layer is smaller in comparison with a glass layer or the like which shows a specific resistance of about $10^{17}$ Ω·cm. Consequently, in case that, the amorphous diamond layer is used as a surface protective layer for a disk-shaped magnetic recording medium, accumulation of fine dust or the like on the protective layer can be prevented, because generation of static electricity based on contact with the magnetic head and friction with the air is decreased.

EXAMPLE

An embodiment of the present invention is illustrated in FIG. 1. The base material 16 is in the form of card, disk or the like and is made of a non-magnetic substance such as plastics, glass and metal. The recording layer 15 is made of ferromagnetic metal such as Co, Cr, Ni and Fe and is formed by using a process such as vacuum vapor deposition or sputtering, and the thickness thereof is caused to be about 1000–3000 Å. For instance, in case of a vertical magnetic recording layer, by adding 10–30% Cr to Co as the main component, a column-shaped structure of Co is formed and Cr segregates at crystal boundaries as an intercrystalline inclusion of the column-shaped structure of Co. In this case, the surface part of the recording layer is rich in Cr.

The amorphous diamond layer 14 is formed by the PI-CVD method on the recording layer 15. For instance, in case the vertical recording layer made of Co and Cr, the amorphous diamond layer formed has a large adhesive strength, since, as mentioned above, the surface of the recording layer is rich in Cr. The thickness of the amorphous diamond layer can be below 1000 Å, and particularly, a thickness of below 300 Å is preferable. Practically, the thickness is determined depending on demand for recording reliability or characteristics of the magnetic recording apparatus.

Figure 8:
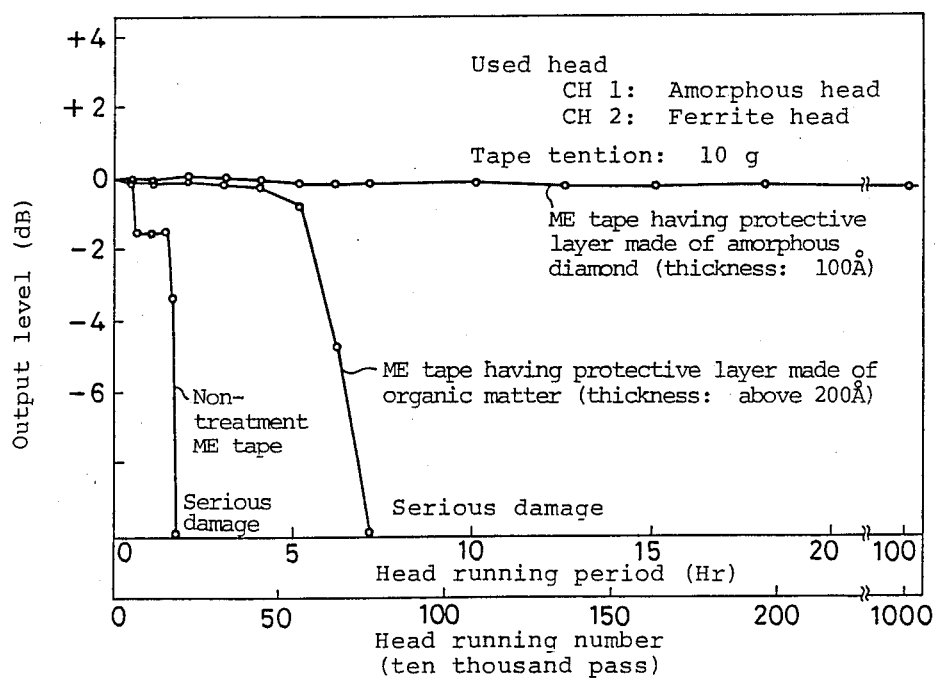
FIG. 8 is a characteristic diagram showing durability of magnetic recording media of the present invention.

The results of an examination for durability of a tape-shaped magnetic recording medium having a thin metal layer as a recording layer (hereinafter referred to as ME tape) is shown in FIG. 8. In this examination, the thin metal layer is made of Co, Ni and oxides thereof; the tension of the ME tape is 10 g; the winding angle around a cylinder of 40 mm in diameter having rotating heads thereon is 180°. In the above-mentioned examination, the same site on the protective layer is placed in contact with the rotating head, and thus the conditions of the examination are rather severe.

As shown in FIG. 8, for non-treated ME tape which has no protective layer, the recording layer is entirely worn out, and output level greatly lowers in about 1.6 hours during which the tape has run along the heads about 180,000 passes). For ME tape having a protective layer made of an organic substance containing fluorine of a thickness of about 200 Å, serious damage is made, and output level lowers in about 6.5 hours of about head 700,000 passes).

On the other hand, for the ME tape having an amorphous diamond layer of 100 Å in the thickness, after above 100 hours has elapsed above head ten million passes) the output level is not lowered, and further damage is not observed on the magnetic head and the ME tape. As mentioned above, the running durability of the ME tape is very much improved, by forming an amorphous diamond layer having a thickness of about 100 Å as its protective layer.

The maximum deposition rate of the amorphous diamond layer reaches 5000 Å/minute. Further, it become possible to continuously form the recording layer 15 and the amorphous diamond layer on the tape-shaped (continuous sheet-shaped) base material in an in-line system (a system of successive forming of the magnetic layer and the protective layer). When the deposition rate of the amorphous diamond layer 14 is lower than that of the recording layer 15, the above-mentioned two layers may be formed respectively with different apparatus.

In case the amorphous diamond layer 14 is formed on the recording layer by the PI-CVD method, the surface of the recording layer 15 may be cleaned in advance by plasma of argon or oxygen or the like. It is allowable that in order to further improve the durability of the recording medium and further decrease the frictional resistance thereof, various surface treatments may be made and other protective layers may be formed on the back surface of the base material 16 and on the surface of the amorphous diamond layer.

As mentioned above, the amorphous diamond layer in the present invention has splendid characteristics such as high hardness, small frictional resistance, excellent thermal conductivity and great chemical stability. Therefore, when recording or playback is practiced with the magnetic head contacting the surface of the protective layer disposed on the ferromagnetic metal layer as recording layer, the recording layer can be protected for a long time without damage to the magnetic head.

Accordingly, the magnetic recording medium of the present invention is very effective to realize high density magnetic recording by using a ferromagnetic metal layer as the recording layer.

What is claimed is:

1. A magnetic recording medium, comprising:
    a base material made of non-magnetic material;
    a recording layer disposed on said base material, said recording layer being made of a ferromagnetic material; and
    a protective layer disposed on said recording layer;
    said protective layer being constituted by a diamond-like film of carbon having a Vicker's hardness of more than 2000 kg/mm$^2$ and a specific resistance of $10^7$ Ω·cm to $10^{13}$ Ω·cm; and
    said ferromagnetic material comprising an element which forms a carbide with carbon of said protective layer, in which said element is bonded to said carbon by covalent bonding or forms an intermetallic compound therewith.

2. The magnetic recording medium of claim 1, wherein:
    said protective layer is an amorphous carbon layer consisting mainly of diamond-structure carbon.

3. The magnetic recording medium of claim 2, wherein:
    said protective layer also includes graphitic carbon.

4. A method for making a magnetic recording medium, comprising:
    (a) providing a base material made of non-magnetic material;
    (b) successively, and in the same chamber,
        (i) forming on said base material a recording layer made of ferromagnetic material by one of sputtering and vapor deposition, and
        (ii) forming on said recording layer a protective layer of amorphous diamond by blowing a hydrocarbon gas plasma onto said recording layer while accelerating towards said recording layer ions of at least one chemical and electronic constituency in said plasma.

5. The method of claim 4, wherein:
    said protective layer is constituted by a diamond-like film of carbon having a Vicker's hardness of more than 2000 kg/mm$^2$ and a specific resistance of $10^7$ Ω·cm to $10^{13}$ Ω·cm.

6. The method of claim 5, wherein:
    said ferromagnetic material comprises an element which forms a carbide with carbon of said protective layer, in which said element is bonded to said carbon by covalent bonding or forms an intermetallic compound therewith.

7. The method of claim 6, wherein:
    said protective layer is an amorphous carbon layer consisting mainly of diamond-structure carbon.

8. The method of claim 7, wherein:
    said protective layer also includes graphitic carbon.

* * * * *